United States Patent
Takanezawa

(10) Patent No.: US 8,619,158 B2
(45) Date of Patent: Dec. 31, 2013

(54) IMAGE REPRODUCTION APPARATUS AND IMAGE REPRODUCTION METHOD

(75) Inventor: Tetsuhiro Takanezawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 13/339,687

(22) Filed: Dec. 29, 2011

(65) Prior Publication Data

US 2012/0098979 A1  Apr. 26, 2012

Related U.S. Application Data

(63) Continuation of application No. 12/533,498, filed on Jul. 31, 2009, now Pat. No. 8,106,964, which is a continuation of application No. 11/416,578, filed on May 2, 2006, now abandoned.

(30) Foreign Application Priority Data

May 10, 2005  (JP) ................................ 2005-137807

(51) Int. Cl.
 *H04N 5/76* (2006.01)
(52) U.S. Cl.
 USPC ..................................... 348/231.3; 348/231.5
(58) Field of Classification Search
 USPC ............................... 348/231.3, 231.5, 333.05
 See application file for complete search history.

(56) References Cited

U.S. PATENT DOCUMENTS

| | | | | |
|---|---|---|---|---|
| 6,570,582 | B1 * | 5/2003 | Sciammarella et al. | 345/660 |
| 6,590,608 | B2 * | 7/2003 | Matsumoto et al. | 348/231.2 |
| 7,508,437 | B2 * | 3/2009 | Suzuki | 348/333.05 |
| 7,657,845 | B2 * | 2/2010 | Drucker et al. | 715/833 |
| 7,742,094 | B2 * | 6/2010 | Matsuno et al. | 348/333.05 |
| 8,106,964 | B2 * | 1/2012 | Takanezawa | 348/231.3 |
| 2001/0048802 | A1 * | 12/2001 | Nakajima et al. | 386/46 |
| 2002/0033848 | A1 * | 3/2002 | Sciammarella et al. | 345/838 |
| 2003/0074373 | A1 * | 4/2003 | Kaburagi et al. | 707/104.1 |
| 2006/0070108 | A1 * | 3/2006 | Renkis | 725/105 |
| 2006/0279628 | A1 * | 12/2006 | Fleming | 348/143 |
| 2007/0147774 | A1 * | 6/2007 | Mori et al. | 386/83 |

* cited by examiner

*Primary Examiner* — James Hannett
(74) *Attorney, Agent, or Firm* — Cowan, Liebowitz & Latman, P.C.

(57) ABSTRACT

An object of this invention is to simplify an operation of reproducing, on a single window, pieces of image information of different image capturing apparatuses or pieces of image information captured at different times. A display apparatus manages a camera apparatus (1) serving as the image capturing source of image information to be reproduced in each image region in association with a plurality of image regions on a single window. The display apparatus manages whether the image information to be reproduced in each image region is recorded image information or image information which is currently being captured. On the basis of the pieces of management information, the display apparatus acquires image information from a desired one of camera apparatuses and recording apparatuses and reproduces the pieces of acquired image information on the plurality of image regions.

22 Claims, 12 Drawing Sheets

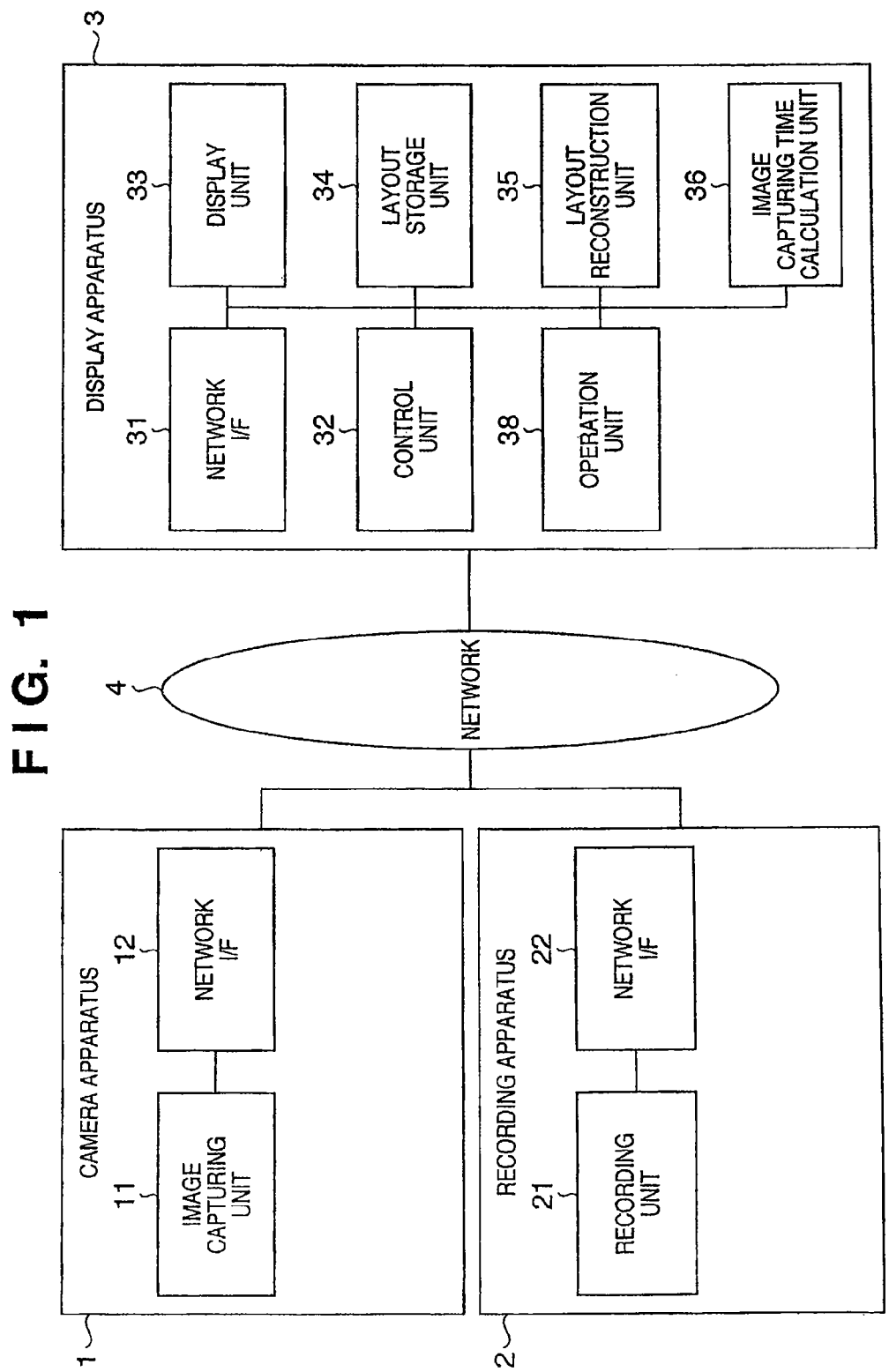

FIG. 2B

| IMAGE | CAMERA APPARATUS | LAYOUT | SIZE | IMAGE CAPTURING TIME OF IMAGE TO BE REPRODUCED |
|---|---|---|---|---|
| 1 | camera1 | (10,10) | 640×480 | Live |
| 2 | camera1 | (670,10) | 320×240 | 08:00 |
| 3 | camera2 | (670,260) | 320×240 | −01:00 |
| 4 | camera3 | (10,500) | 160×120 | 2004/12/24  12:00 |
| 5 | camera4 | (150,500) | 160×120 | Mon−Fri  17:00 |

FIG. 3

| IMAGE CAPTURING TIME OF IMAGE TO BE REPRODUCED | CONTENTS |
|---|---|
| Live | IMAGE WHICH IS CURRENTLY BEING CAPTURED BY CAMERA APPARATUS IS DISPLAYED. LIVE IMAGE DISPLAY. |
| 08:00 | RECORDED IMAGE AT PAST SET TIME NEAREST TO CURRENT TIME IS REPRODUCED. FOR EXAMPLE, WHEN CURRENT TIME IS 07:00 ON DECEMBER 13, 2004, RECORDED IMAGE AT 08:00 ON DECEMBER 12, 2004 IS REPRODUCED. |
| −01:00 | IMAGE RECORDED SET TIME AGO FROM CURRENT TIME IS REPRODUCED. IN EXAMPLE, IMAGE RECORDED ONE HOUR AGO FROM CURRENT TIME IS REPRODUCED. |
| 2004/12/24 12:00 | RECORDED IMAGE AT SET TIME IS DISPLAYED. IN EXAMPLE, RECORDED IMAGE AT 12:00 ON DECEMBER 24, 2004 IS REPRODUCED. |
| Mon-Fri 17:00 | RECORDED IMAGE AT PAST SET TIME ON DAY OF WEEK NEAREST TO CURRENT TIME IS REPRODUCED. IN EXAMPLE, RECORDED IMAGE AT 17:00 FROM MONDAY TO FRIDAY NEAREST TO CURRENT TIME IS REPRODUCED. |

FIG. 7

| CAMERA APPARATUS | ZONE | LOCATION |
|---|---|---|
| CAMERA 01 | FIRST BUILDING | FRONT ENTRANCE TO HALL |
| CAMERA 02 | FIRST BUILDING | BACK ENTRANCE TO HALL |
| CAMERA 03 | FIRST BUILDING | ELEVATOR HALL 1F |
| CAMERA 04 | FIRST BUILDING | ELEVATOR HALL 2F |
| CAMERA 05 | SECOND BUILDING | MAIN ENTRANCE |
| CAMERA 06 | PARKING AREA | BLOCK A NORTH |
| CAMERA 07 | PARKING AREA | BLOCK A SOUTH |
| CAMERA 08 | PARKING AREA | BLOCK A EAST |
| CAMERA 09 | PARKING AREA | BLOCK A WEST |
| CAMERA 10 | PARKING AREA | BLOCK B |
| CAMERA 11 | PARKING AREA | BLOCK B |

FIG. 9

| ORDER | LAYOUT POSITION | SIZE |
|---|---|---|
| 1 | (10,10) | 640 × 480 |
| 2 | (660,10) | 320 × 240 |
| 3 | (660,260) | 320 × 240 |
| 4 | (10,500) | 320 × 240 |
| 5 | (330,500) | 320 × 240 |
| 6 | (660,500) | 320 × 240 |

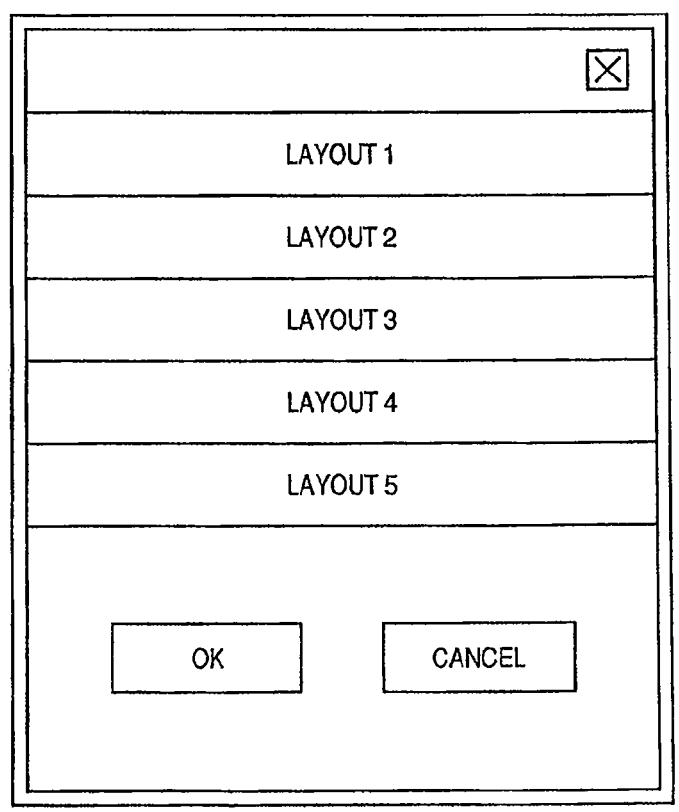
F I G. 11

IMAGE REPRODUCTION APPARATUS AND IMAGE REPRODUCTION METHOD

CROSS-REFERENCE TO RELATED APPLICATION

This application is a continuation of application Ser. No. 12/533,498, filed Jul. 31, 2009; which is a continuation of application Ser. No. 11/416,578, filed May 2, 2006, the entire disclosures of which are hereby incorporated by reference.

FIELD OF THE INVENTION

The present invention relates to an image reproduction apparatus and image reproduction method to reproduce image information from an image capturing apparatus in a plurality of display regions on a single window.

BACKGROUND OF THE INVENTION

A network camera system is known, which displays an image captured by a camera on a terminal apparatus such as a personal computer in real time and controls the image capturing direction of the camera from the terminal apparatus by using the Internet technology. There exists a monitoring system which records and reproduces a camera image from a remote site by using the network camera system.

To display a plurality of recorded images on a single window, the conventional monitoring system employs a method of, e.g., simultaneously recording/reproducing the contents of a plurality of images on a magnetic tape.

However, if, for example, a user wants to reproduce a camera image of a specific time while simultaneously reproducing another camera image of a specific time and compare the images, the operation is complex.

SUMMARY OF THE INVENTION

It is an object of the present invention is to simplify an operation of reproducing, on a single window, pieces of image information captured by different image capturing apparatuses or pieces of image information captured by a single image capturing apparatus at different times.

In order to achieve the above object, an image reproduction apparatus according to the present invention is characterized by mainly having the following arrangement.

An image reproduction controlling apparatus for control a reproduction of an image, comprising a reading unit adapted to read out, from a storage device to store layout information, layout information that associates position information of a region to be laid out on a screen, an image capturing apparatus which captures an image to be reproduced on the region, and image capturing time information of the image to be reproduced and a control unit adapted to control a reproduction of an image corresponding to the region laid out on the screen on the basis of the layout information read out by the reading unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing the overall configuration of a network camera system according to an embodiment of the present invention;

FIGS. 2A and 2B are views showing a window display composition example on a display unit and an example of layout information;

FIG. 3 is a table showing the correspondence between the designation method of image capturing time information of an image to be reproduced in the layout information and the image capturing time calculation method by an image capturing time calculation unit corresponding to the designated contents;

FIG. 7 is a table showing an example of associated information;

FIG. 9 is a table showing an example of layout format information;

FIG. 11 is a view showing an example of a menu window according to an embodiment of the present invention.

DETAILED DESCRIPTION OF THE PREFERRED EMBODIMENTS

Figure 2A:
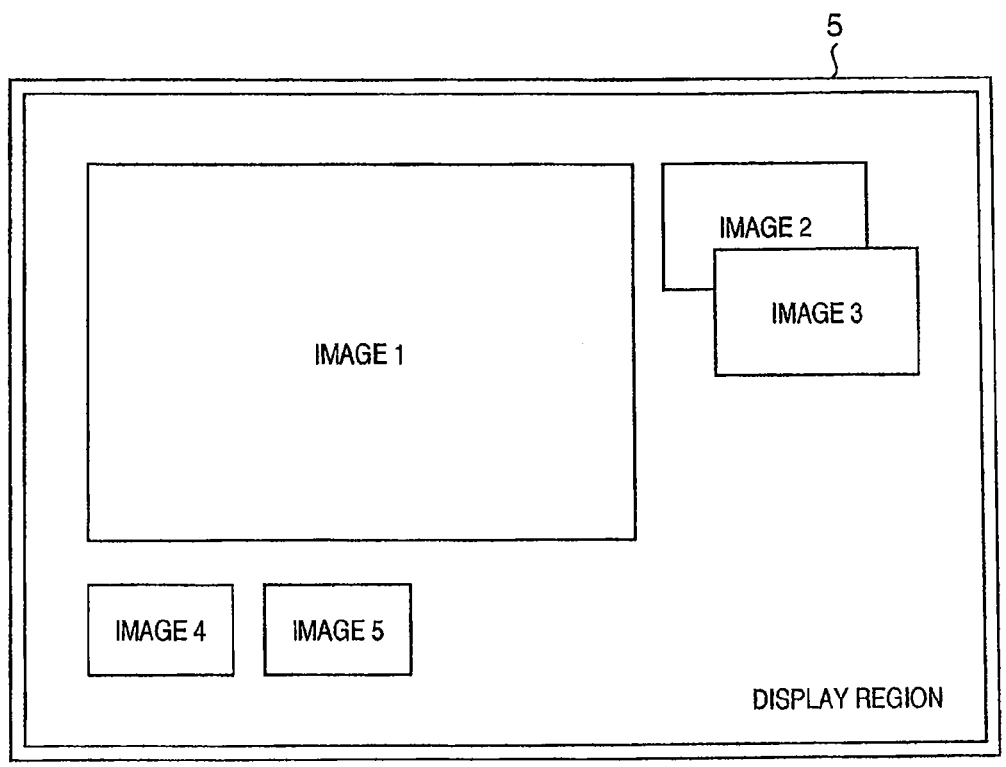

Preferred embodiments of the present invention will now be described in detail in accordance with the accompanying drawings.

An embodiment of the present invention will be described below.

(First Embodiment)

FIG. 1 is a block diagram showing the overall configuration of a network camera system according to the first embodiment of the present invention. The network camera system shown in FIG. 1 includes a camera apparatus (image capturing apparatus) 1, recording apparatus 2, display apparatus 3, and network 4.

The camera apparatus 1 includes an image capturing unit 11 which captures an image, and a network I/F 12 which transmits/receives information through the network 4. The image capturing unit 11 includes an A/D converter to A/D-convert an image signal from an image sensing element such as a CCD, an image processing circuit to execute, e.g., chrominance signal processing and compression processing, and a control circuit to control the image capturing unit 11. The recording apparatus 2 includes a recording unit 21 which records and stores images from the camera apparatus 1, and a network I/F 22 which transmits/receives information through the network 4. The recording apparatus 2 includes a nonvolatile memory such as a hard disk, and a recording control circuit to read/write an image from/in a memory in accordance with an external request signal.

The display apparatus 3 transmits/receives information through the network 4. The display apparatus 3 has a network I/F 31, a control unit 32 which controls the acquisition source of images to be displayed, and a display unit 33, like a Liquid Crystal Display, which displays a plurality of acquired images on a screen. The display apparatus 3 also has a layout storage unit 34 which stores layout information containing an image layout on a screen, the correspondence between each image and the camera apparatus 1, and time designation. The display apparatus 3 also includes a layout reconstruction unit 35 which reconstructs display on the display unit 33 from layout information stored in the layout storage unit 34 having a nonvolatile memory, and an image capturing time calculation unit 36 which calculates an image capturing time from a time designation in layout information.

The display apparatus 3 includes an operation unit 38 having a mouse and a keyboard to input a user instruction to set layout information. The processing operations of the control unit 32, layout reconstruction unit 35, and image capturing time calculation unit 36 are executed by a single processing unit. In this case, the processing unit reads out a program stored in the ROM to the RAM and executes the processing operations of the control unit 32, layout reconstruction unit 35, and image capturing time calculation unit 36 on the basis of the program. The processing operations of the control unit 32, layout reconstruction unit 35, and image capturing time calculation unit 36 can also be executed by different control circuits.

FIG. 2A shows an example of a screen displayed on the display unit 33. On this screen, the position and size of each image region to display an image can freely be set. A plurality of images captured by the single camera apparatus 1 at different times can also be displayed simultaneously. The image regions to display images can overlap.

FIG. 2B shows an example of layout information stored in the layout storage unit 34 in correspondence with the screen in FIG. 2A. In the layout information, each of image regions 1 to 5 is associated with camera apparatus information, arrangement information, size information, and image capturing time information of an image captured by the camera apparatus 1 as an image capturing apparatus.

The "camera apparatus" information represents a camera apparatus which has captured an image to be displayed in each of image regions 1 to 5. The "arrangement information (position information)" represents the arrangement of each of image regions 1 to 5 on a display region 5. The "size" represents the size of an image to be displayed in each of image regions 1 to 5. The information of "image capturing time of an image to be reproduced" represents whether a display target image is an image which is currently being captured by the camera apparatus 1. When the display target image is a recorded image, this information represents the image capturing time of the recorded image to be reproduced.

FIG. 3 shows a setting example of image capturing time information of an image to be reproduced in the layout information and the image capturing time calculation method by the image capturing time calculation unit 36 corresponding to the contents of the setting example. The information of "image capturing time of an image to be reproduced" in the layout information shown in FIG. 2B is represented by a combinations of settings shown in FIG. 3.

If, e.g., "Live" is set as the image capturing time information of an image to be reproduced, processing of successively acquiring images captured by the camera apparatus 1 from it and reproducing the images is set.

If, e.g., "08:00" is set as the image capturing time information of an image to be reproduced, reproduction of a stored image which has been captured at the past set time nearest to the current time is set. In the example shown in FIG. 3, the current time is 7:00 on Dec. 13, 2004. Hence, reproduction processing of a recorded image captured at 8:00 on Dec. 12, 2004 is set.

If, e.g., "−01:00" is set as the information of "image capturing time of an image to be reproduced", reproduction of a stored image which has been captured the set time (i.e., one hour) ago from the current time is set.

If, e.g., "2004/12/24 12:00" is set as the information of "image capturing time of an image to be reproduced", reproduction of a stored image which has been captured at the set time (i.e., 12:00 on Dec. 24, 2004) is set.

If, e.g., "Mon-Fri 17:00" is set as the information of "image capturing time of an image to be reproduced", reproduction of a recorded image at the past set time nearest to the current time is set. In the example shown in FIG. 3, a stored image captured at 17:00 from Monday to Friday nearest to the current time is set.

In this embodiment, a region to display an image from each camera apparatus 1 is set on the screen by the user's operation. The image capturing time information of the image to be reproduced is set for each image. Upon detecting a storage instruction from the user, the control unit 32 stores the set information in the layout storage unit 34 as layout information. The layout storage unit 34 can store a plurality of pieces of layout information. The user can avoid re-setting in every activation of the display apparatus 3 by invoking the layout information.

Figure 10:
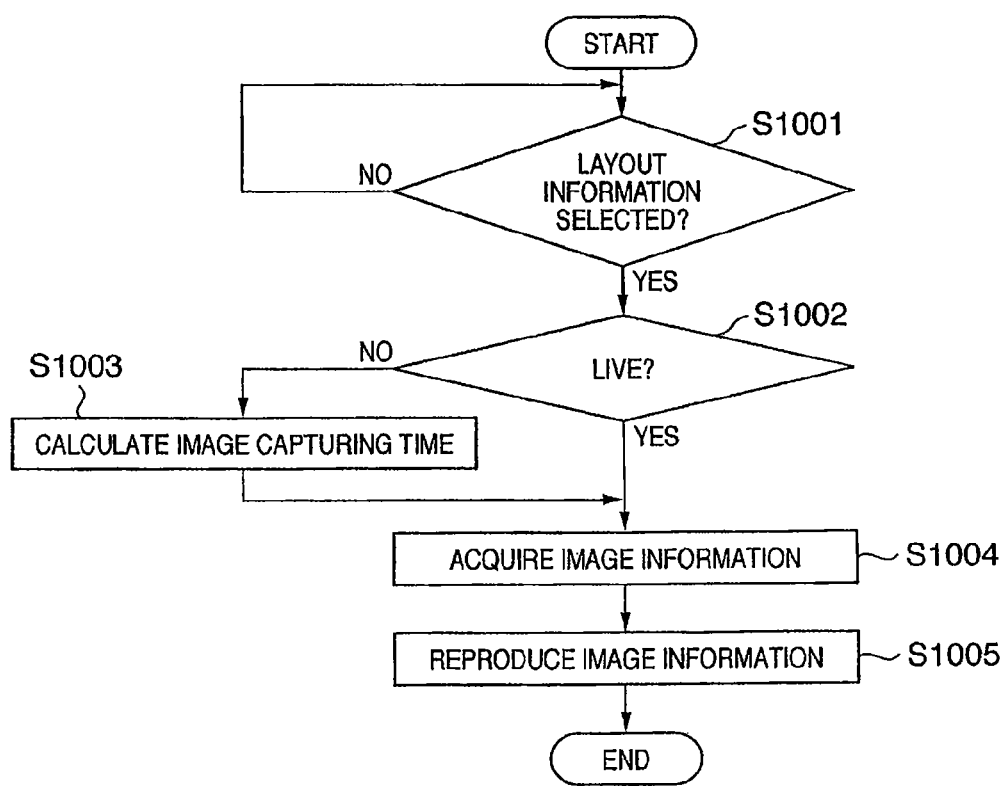
FIG. 10 is a flowchart showing the operation of a display apparatus according to an embodiment of the present invention.

The operation of the display apparatus 3 according to this embodiment will be described next with reference to the flowchart in FIG. 10 which is executed by the control unit 32 of the display apparatus.

The control unit 32 detects that the user has selected, on a menu window shown in FIG. 11, a desired one of a plurality of pieces of layout information stored in the layout storage unit 34 (YES in step S1001). The control unit 32 reads out the selected layout information from the layout storage unit 34. The layout reconstruction unit 35 reconstructs image display regions on the screen.

It is determined whether the information of "image capturing time of an image to be reproduced" in the selected layout information is "Live". When reproduction display of an image that is currently being captured by the camera apparatus 1 is set (YES in step S1002), the control unit 32 accesses the camera apparatus 1 on the basis of its address information that is associated with the layout information in advance and acquires the image (step S1004).

On the other hand, if the image capturing time information of an image to be reproduced in the selected layout information designates reproduction of a recorded image, like "08:00", "−01:00", "2004/12/24 12:00", or "Mon-Fri 17:00" in the above-described example (NO in step S1002), the flow advances to step S1003. In step S1003, the image capturing time calculation unit 36 calculates the image capturing time of the image on the basis of the current time and the image capturing time information of the image to be reproduced.

The control unit 32 acquires, from the recording apparatus 2, a recorded image at the image capturing time calculated by the image capturing time calculation unit 36 of the camera corresponding to the camera information in the selected layout information (step S1004). The address information of the recording apparatus 2 to be accessed to acquire the image is associated with the layout information in advance.

The display unit 33 displays the image acquired by the control unit 32 in a corresponding region on the screen on the basis of the layout information in the selected layout information (step S1005).

The system configuration shown in FIG. 1 can also be applied to a configuration which connects a plurality of camera apparatuses 1 and a plurality of recording apparatuses 2 through the network 4.

In this network configuration, images from the camera apparatuses 1 may be stored in a representative one of the plurality of recording apparatuses 2 or stored in each recording apparatus 2. The recording apparatus 2 and display apparatus 3 may be integrated.

When it is detected that the user has selected, on the menu window shown in FIG. 11, a desired one of the pieces of layout information stored in the layout storage unit 34, the selected layout information is read out from the layout storage unit 34. The layout reconstruction unit 35 reconstructs image display regions on the screen.

When display of a currently captured image is set as the image capturing time information of an image to be reproduced in the selected layout information, the control unit 32 acquires a live image from the camera apparatus 1 corresponding to the camera information set in the selected layout information.

When display of a recorded image is designated by the information of "image capturing time of an image to be reproduced" in the selected layout information, the control unit 32 acquires, from the representative recording apparatus 2, correspondence information between the camera apparatus 1 and the recording apparatus 2 which records the image of the camera apparatus 1. The control unit 32 acquires the image from the recording apparatus 2 on the basis of the correspondence information.

With such processing, the display unit 33 can display the image acquired by the control unit 32 in a region designated by the arrangement information in the layout information.

(Second Embodiment)

The second embodiment will be described next.

Figure 4:
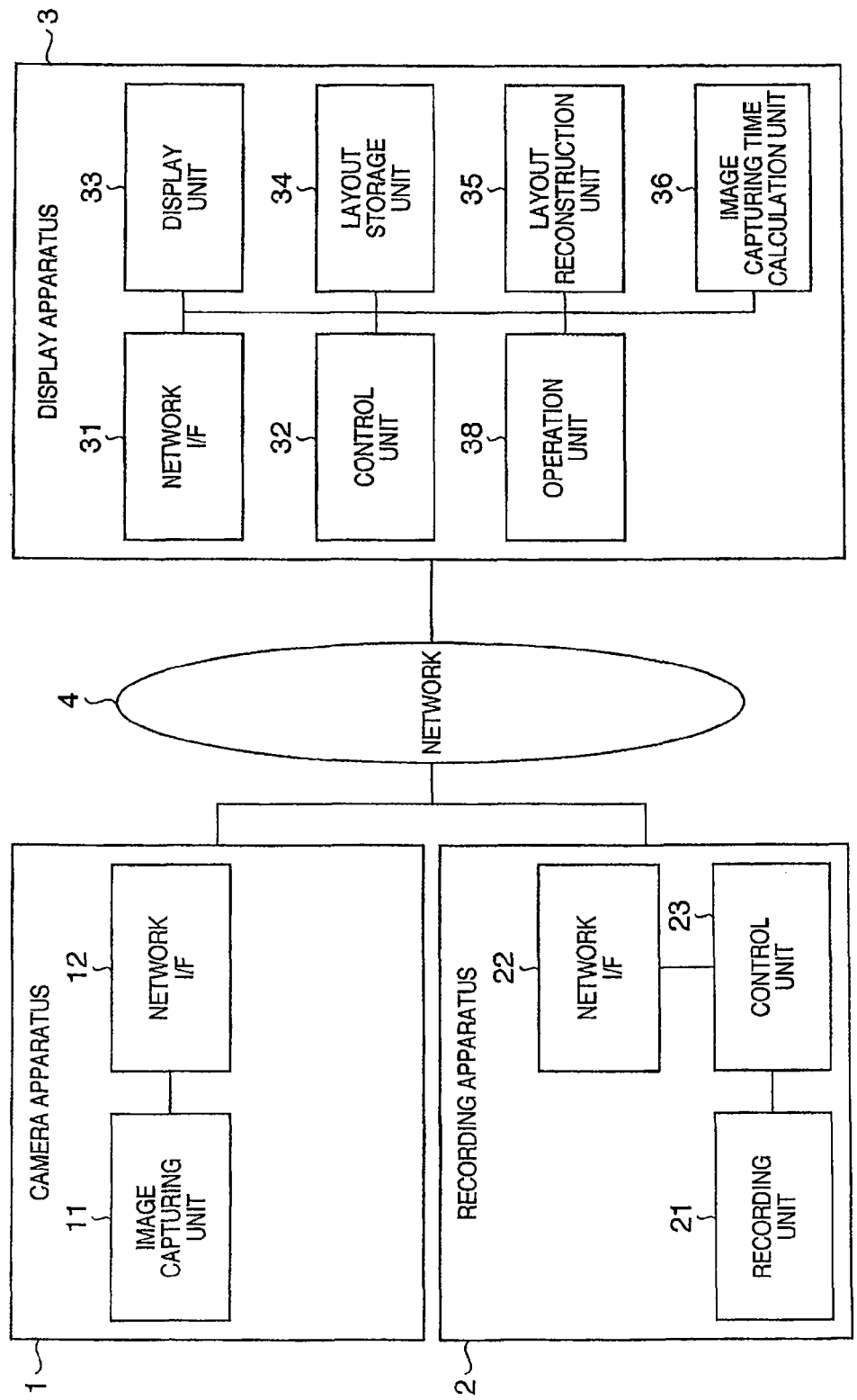
FIG. 4 is a block diagram showing the overall configuration of a network camera system according to an embodiment of the present invention.

In the second embodiment, a form which causes a recording apparatus 2 to serve as a relay server will be described. FIG. 4 is a block diagram showing the configuration of a network camera system according to this embodiment. As shown in FIG. 4, the configuration of the network camera system of this embodiment is the same as that shown in FIG. 1 except that a control unit 23 is added to a recording apparatus 2. The control unit 23 controls the image acquisition source on the side of the recording apparatus 2. The control unit 23 includes a ROM to store a program, a RAM to temporarily store the program read out from the ROM, and a processing unit to control the entire recording apparatus 2 on the basis of the program temporarily stored in the RAM.

It is detected that the user has selected, on a menu window shown in FIG. 11, a desired one of pieces of layout information stored in a layout storage unit 34. Upon this detection, a layout reconstruction unit 35 reconstructs image display regions on the screen in accordance with the selected layout information.

When the information of "image capturing time of an image to be reproduced" in the selected layout information sets reproduction of a recorded image, an image capturing time calculation unit 36 calculates the image capturing time of the image on the basis of the current time and the information of "image capturing time of the image to be reproduced".

To acquire the reproduction target image, a control unit 32 transmits the calculated image capturing time and camera information in the layout information to the recording apparatus 2 which has recorded the image captured by a camera apparatus 1.

When the image capturing time information of an image to be reproduced in the selected layout information designates display of an image which is currently being captured by the camera apparatus 1, the control unit 32 transmits information representing live image reproduction and camera information in the layout information to the recording apparatus 2.

Upon receiving the image capturing time from a display apparatus 3, the control unit 23 acquires, from a recording unit 21, the image of the camera apparatus 1 indicated by the camera information at the image capturing time and transmits the image to the display apparatus 3.

Upon receiving the information representing live image reproduction from the display apparatus 3, the control unit 23 acquires the image from the camera apparatus 1 indicated by the camera information and transmits the image to the display apparatus 3. The display apparatus 3 causes a display unit 33 to display the image received from the recording apparatus 2 in a region designated by arrangement information in the layout information.

(Third Embodiment)

The third embodiment will be described next.

In the third embodiment, layout information is created in response to sensor detection.

Figure 5:
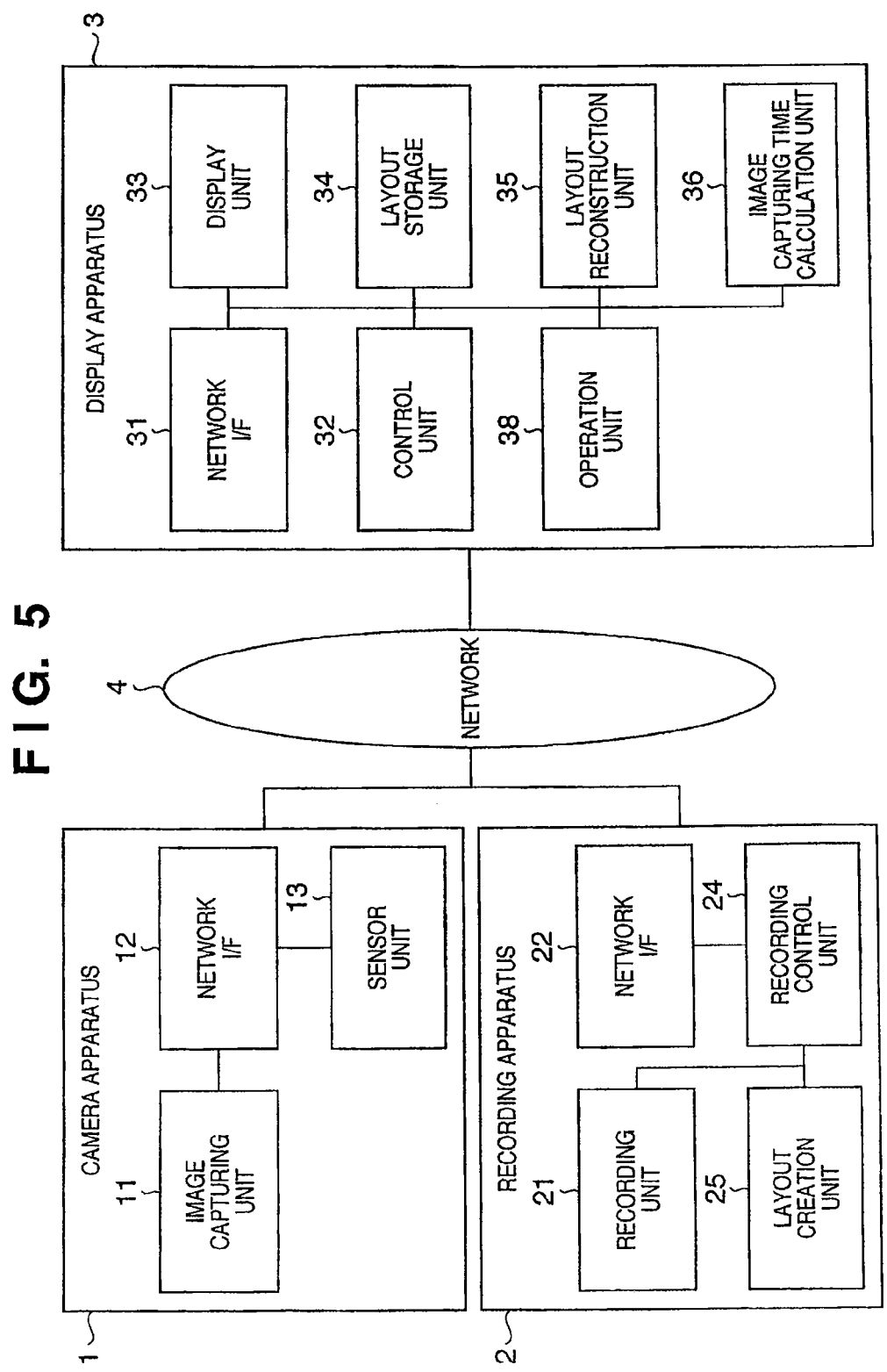
FIG. 5 is a block diagram showing the overall configuration of a network camera system according to an embodiment of the present invention.

FIG. 5 is a block diagram showing the configuration of a network camera system according to the third embodiment. As shown in FIG. 5, the configuration of the network camera system of this embodiment is the same as that shown in FIG. 1 except that a sensor unit 13 is added to a camera apparatus 1, and a recording control unit 24 and layout creation unit 25 are added to a recording apparatus 2.

The sensor unit 13 comprises a sensor such as a photosensor, sonic sensor, or temperature sensor to detect a change in the situation around the camera apparatus 1. The sensor unit 13 may include a notification by image analysis such as motion detection, person detection, face detection, or color detection from a captured image or a combination thereof.

The recording control unit 24 changes recording settings such as the frame rate, size, and quality of an image from the camera apparatus 1, which is to be recorded in a recording unit 21, in accordance with a state change notification from the sensor unit 13.

The layout creation unit 25 creates layout information in accordance with a notification from the sensor unit 13 and transmits the created information to a layout storage unit 34. Various settings shown in FIGS. 2A and 2B which are necessary for creating the layout information are stored in the layout creation unit 25.

Pieces of associated information of a plurality of camera apparatuses 1 are stored in the layout creation unit 25. The associated information includes the information of camera apparatuses capturing the same object from different directions, camera apparatuses installed in the same corridor in a building, or image capturing apparatuses installed in different floors of a flight of stairs. These pieces of information are set in advance.

Upon receiving a notification from the sensor unit 13, the layout creation unit 25 creates layout information to reproduce an image from the camera apparatus 1 that has transmitted the notification. More specifically, the layout creation unit 25 creates layout information containing the notification time or a time a predetermined time ago from the notification time as the image capturing time information of the to-be-reproduced image of the camera apparatus 1.

The layout creation unit 25 also creates layout information to reproduce an image from each camera apparatus associated with the camera apparatus 1 whose sensor unit 13 has transmitted the notification. More specifically, the layout creation unit 25 creates layout information containing the notification time or a time a predetermined time ago from the notification time as the image capturing time information of the to-be-reproduced image of each camera apparatus associated with the camera apparatus 1.

Layout information containing the live images of the camera apparatus 1 and each camera apparatus associated with the camera apparatus 1 may be created.

The processing operations of the recording control unit 24 and the layout creation unit 25 are executed by a single processing unit. In this case, the processing unit reads out a program stored in the ROM to the RAM and executes the processing operations of the recording control unit 24 and the layout creation unit 25 on the basis of the program.

FIG. 7 is a table showing an example of the associated information of the camera apparatuses 1. In the example shown in FIG. 7, the camera apparatuses 1 are classified on the basis of two pieces of information: zone and location.

More specifically, camera apparatuses in the same zone as the camera apparatus whose sensor unit 13 has transmitted a notification and camera apparatuses in the same location as the camera apparatus that has transmitted a notification are assumed as associated camera apparatuses.

The associated camera apparatuses may be camera apparatuses that satisfy a reference condition designated by the user through the display apparatus 3. In designating camera apparatuses which are installed in the same zone as the camera apparatus that has transmitted the notification and satisfy a specific reference condition, for example, assume that the camera apparatus 1 with the sensor unit 13 having transmitted a notification is camera 06, and "parking area" is designated as the reference condition. In this case, the association targets are cameras 07 to 11.

In designating camera apparatuses which are installed in the same location as the camera apparatus that has transmitted the notification and satisfy a specific reference condition, for example, assume that the camera apparatus that has transmitted a notification is camera 03, and "elevator hall" is designated as the reference condition. In this case, the association target is camera 04.

The associated camera apparatuses may be camera apparatuses that satisfy a join of the above-described conditions or camera apparatuses that satisfy a meet of the above-described conditions.

The layout information thus created by the layout creation unit 25 is transmitted to a display apparatus 3 and stored in a layout storage unit 34. A control unit 32 of the display apparatus 3 acquires the image to be reproduced from the camera apparatus 1 to recording apparatus 2 on the basis of the stored layout information. A display unit 33 displays the acquired image.

Layout creation by the layout creation unit 25 may be done every time a predetermined time elapses from detection of the sensor unit 13. In this case, the layout creation unit 25 stores the log of notifications from the sensor unit 13 of each camera apparatus 1.

When a notification from the sensor unit 13 is received after the elapse of a predetermined time, layout information containing the notification time as the image capturing time information of the to-be-reproduced image of the camera apparatus 1 is created. In addition, on the basis of the notification log, the layout creation unit 25 creates layout information containing the notification times of several close, past notifications as the image capturing time of the to-be-reproduced image of the camera apparatus 1.

Figure 6:
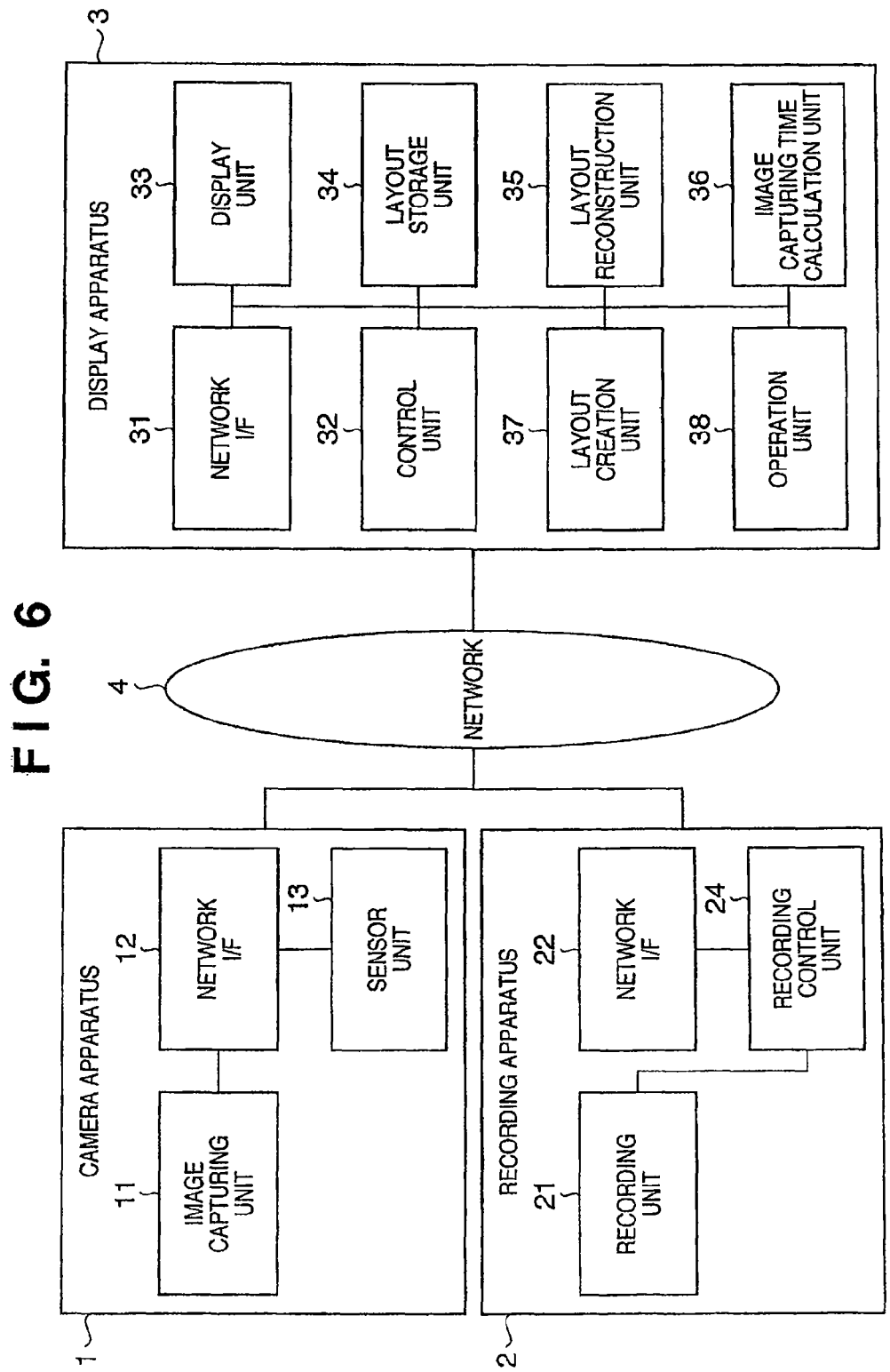
FIG. 6 is a block diagram showing the overall configuration of a network camera system according to an embodiment of the present invention.

Layout creation may be done on the side of the display apparatus 3, as shown in FIG. 6. The configuration of the network camera system of this embodiment is the same as that shown in FIG. 5 except. that the layout creation unit 25 is removed from the recording apparatus 2, and a layout creation unit 37 is added to the display apparatus 3.

Layout information to display images in a display region 5, which should be created as the layout information, is created by using layout information set in advance in correspondence with the number of images to be displayed.

(Fourth Embodiment)

The fourth embodiment will be described next. The configuration shown in FIG. 5 or 6 is applied to a network camera system according to the fourth embodiment.

Figure 8:
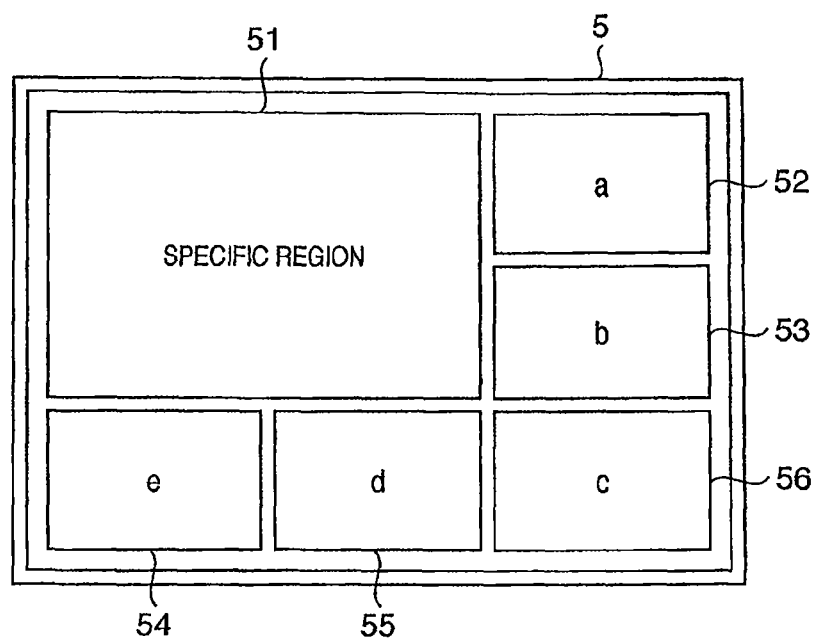
FIG. 8 is a view showing an example of an image display composition on a display unit.

FIG. 8 is a view showing an example of an image display composition on a display unit 33. A display region 5 is a region displayed on the display unit 33 and includes a specific region 51. Image regions a52, b53, c54, d55, and e56 are regions to reproduce and display an image captured by a camera apparatus.

FIG. 9 is a table showing an example of layout format information. The layout format information contains at least the layout order information of images in the image regions, the layout position information of the image regions, and the size information of the image regions. When the layout format information is created in response to a user operation, the layout format information is stored in a layout creation unit 25 shown in FIG. 5 or layout creation unit 37 shown in FIG. 6.

The form of this embodiment creates layout format information on the basis of the degree of association to a camera apparatus having a sensor unit 13 that has transmitted a notification.

For example, the display unit 33 displays, in the specific region 51, the image of the camera apparatus that has transmitted a notification. Assume that camera apparatuses a, b, and c are present as camera apparatuses associated with the camera apparatus that has transmitted the notification, and the degree of association becomes high in the order of camera apparatuses c, b, and a. When the degree of association becomes high in the order of image regions a, b, and c, it is decided to display the image from the camera apparatus c in the image region a, the image from the camera apparatus b in the image region b, and the image from the camera apparatus a in the image region c.

According to the above-described embodiments, the layout of images from cameras on the screen in steady browsing and the image capturing time of each camera are obtained. On the basis of these pieces of information, the images can be displayed on the display unit. Hence, the user operation can be simplified.

The object of the present invention can also be achieved by supplying a storage medium which records software program codes for implementing the functions of the above-described embodiments to the camera apparatus 1, recording apparatus 2, and display apparatus 3 and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium to supply the program codes, for example, a flexible disk, hard disk, optical disk, magnetooptical disk, CD-ROM, CD-R, magnetic tape, nonvolatile memory card, ROM, and the like can be used.

The functions of the above-described embodiments are implemented not only when the readout program codes are executed by the computer but also when the OS (fundamental system or operating system) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-137807 filed on May 10, 2005, which is hereby incorporated by reference herein in its entirety.

What is claimed is:

1. An image reproduction controlling apparatus for controlling a reproduction of an image, comprising:
a reading unit configured to read out, from a storage device, specifying information;
an acquiring unit configured to acquire a first image from an image recording apparatus, and a second image from a second image capturing apparatus, in a case where first specifying information read out by the reading unit indicates a first image capturing apparatus and a specific time corresponding to a past time, and second specifying information read out by the reading unit indicates the current time, the first image is captured at the specific time by the first image capturing apparatus indicated by the first specifying information read out by the reading unit; and
a control unit configured to control the reproduction of the images such that the first image captured at the specific time and acquired from the image recording apparatus, and the second image captured by the second image capturing apparatus are reproduced in accordance with a predetermined layout.

2. The apparatus according to claim 1, wherein
the acquiring unit acquires the latest image in a plurality of images captured at a past time corresponding to the first specifying information in a case where the first specifying information includes time information and does not include date information and the plurality of images are recorded by the image recording apparatus.

3. The apparatus according to claim, 1 wherein
the acquiring unit acquires the first image captured at past time based on difference time information and the current time in a case where the first specifying information includes the difference time information representing difference from the current time.

4. The apparatus according to claim 1, further comprising:
a detecting unit configured to detect the change in a state around the image capturing apparatus; and
a creating unit configured to create, in a case where the change in the state around the image capturing apparatus is detected by said detecting unit, the information to reproduce the image captured by the image capturing unit, one of a detection time and a predetermined time ago from the detection time.

5. An image reproduction controlling method of an image reproduction controlling apparatus for controlling a reproduction of an image, comprising steps of:
reading, from a storage device, specifying information;
acquiring a first image from an image recording apparatus, and a second image from a second image capturing apparatus, in a case where first specifying information read out from the storage device indicates a first image capturing apparatus and a specific time corresponding to a past time, and second specifying information read out from the storage device indicates the current time, the first image is captured at the specific time by the first image capturing apparatus indicated by the first specifying information read out from the storage device; and
controlling the reproduction of the images such that the first image captured at the specific time and acquired from the image recording apparatus, and the second image captured by the second image capturing apparatus are reproduced in accordance with a predetermined layout.

6. The method according to claim 5, wherein
the acquiring step acquires the latest image in a plurality of images captured at past time corresponding to the first specifying information in a case where the first specifying information includes time information and does not include date information and the plurality of images are recorded by the image recording apparatus.

7. The method according to claim 5, wherein
the acquiring step acquires the first image captured at past time based on difference time information and the current time in a case where the first specifying information includes the difference time information representing difference from the current time.

8. A non-transitory computer-readable medium storing a program which causes a computer to execute an image reproduction controlling method of an image reproduction controlling apparatus for controlling a reproduction of an image, said image reproduction controlling method comprising steps of:
reading, from a storage device, specifying information;
acquiring a first image from an image recording apparatus, and a second image from a second image capturing apparatus, in a case where first specifying information read out from the storage device indicates a first image capturing apparatus and a specific time corresponding to a past time, and second specifying information read out from the storage device indicates the current time, the first image is captured at the specific time by the first image capturing apparatus indicated by the first specifying information read out from the storage device; and
controlling the reproduction of the images such that the first image captured at the specific time and acquired from the image recording apparatus, and the second image captured by the second image capturing apparatus are reproduced in accordance with a predetermined layout.

9. The medium according to claim 8, wherein
the acquiring step acquires the latest image in a plurality of images captured at past time corresponding to the first specifying information in a case where the first specifying information includes time information and does not include date information and the plurality of images are recorded by the image recording apparatus.

10. The medium according to claim 8, wherein
the acquiring step acquires the first image captured at past time based on difference time information and the current time in a case where the first specifying information includes the difference time information representing difference from the current time.

11. An image reproduction controlling apparatus for controlling a reproduction of an image, comprising:
a reading unit configured to read out, from a storage device, information indicating identification information of an image capturing apparatus, and image capturing time information;

an acquiring unit configured to acquire the latest image captured at a capture time corresponding to a specific time specified by first specifying information, from an image recording apparatus, in a plurality of images captured at past time corresponding to the specific time specified by the first specifying information, and to acquire a live image from a second image capturing apparatus in accordance with second specifying information, in a case where the first specifying information indicates a first image capturing apparatus and includes time information for specifying the specific time and does not include date information, and the second specifying information of indicates the current time; and a control unit configured to control the reproduction of the images such that the latest image in a plurality of images captured at the past time corresponding to the specific time and acquired from the image recording apparatus and the live image acquired from the second image capturing apparatus are reproduced in accordance with a predetermined layout.

12. The apparatus according to claim 11 wherein the acquiring unit acquires a third image captured at past time based on difference time information and the current time in a case where third specifying information includes the difference time information representing difference from the current time.

13. An image reproduction controlling method of an image reproduction controlling apparatus for controlling a reproduction of an image, comprising:

reading, from a storage device, specifying information;

acquiring the latest image captured at a capture time corresponding to a specific time specified by first specifying information, from an image recording apparatus, in a plurality of images captured at past time corresponding to the specific time specified by the first specifying information, and to acquire a live image from a second image capturing apparatus in accordance with second specifying information, in a case where the first specifying information indicates a first image capturing apparatus and includes time information for specifying the specific time and does not include date information, and the second specifying information indicates the current time; and controlling the reproduction of the images such that the latest image in a plurality of images captured at the past time corresponding to the specific time and acquired from the image recording apparatus and the live image acquired from the second image capturing apparatus are reproduced in accordance with a predetermined layout.

14. The method according to claim 13 wherein the acquiring step acquires a third image captured at past time based on difference time information and the current time in a case where third specifying information includes the difference time information representing difference from the current time.

15. A non-transitory computer-readable medium storing a program which causes a computer to execute an image reproduction controlling method of an image reproduction controlling apparatus for controlling a reproduction of an image, comprising:

reading, from a storage device, specifying information;

acquiring the latest image captured at a capture time corresponding to a specific time specified by first image capturing time information, from an image recording apparatus, in a plurality of images captured at past time corresponding to the specific time specified by the first specifying information, and to acquire a live image from a second image capturing apparatus in accordance with second specifying information, in a case where the first specifying information indicates a first image capturing apparatus and includes time information for specifying the specific time and does not include date information, and the second specific information indicates the current time; and controlling the reproduction of the images such that the latest image in a plurality of images captured at the past time corresponding to the specific time and acquired from the image recording apparatus and the live image acquired from the second image capturing apparatus are reproduced in accordance with a predetermined layout.

16. The medium according to claim 15 wherein the acquiring step acquires a third image captured at past time based on difference time information and the current time in a case where third specifying information includes the difference time information representing difference from the current time.

17. The apparatus according to claim 1, wherein the acquiring unit acquires the first image captured at the specific time by the first image capturing apparatus specified by the first specifying information, and acquires the second image captured by the second image capturing apparatus specified by the second specifying information.

18. The method according to claim 5, wherein the acquiring step acquires the first image captured at the specific time by the first image capturing apparatus specified by the first specifying information, and acquires the second image captured by the second image capturing apparatus specified by the second specifying information.

19. The medium according to claim 8, wherein the acquiring step acquires the first image captured at the specific time by the first image capturing apparatus specified by the first specifying information, and acquires the second image captured by the second image capturing apparatus specified by the second specifying information.

20. The apparatus according to claim, 11 wherein the acquiring unit acquires the first image captured at the specific time by the first image capturing apparatus specified by the first specifying information, and acquires the second image captured by the second image capturing apparatus specified by the second specifying information.

21. The method according to claim, 13 wherein the acquiring step acquires the first image captured at the specific time by the first image capturing apparatus specified by the first specifying information, and acquires the second image captured by the second image capturing apparatus specified by the second specifying information.

22. The medium according to claim, 15 wherein the acquiring step acquires the first image captured at the specific time by the first image capturing apparatus specified by the first specifying information, and acquires the second image captured by the second image capturing apparatus specified by the second specifying information.

* * * * *